US011962614B2

(12) United States Patent
Kirti et al.

(10) Patent No.: US 11,962,614 B2
(45) Date of Patent: *Apr. 16, 2024

(54) TECHNIQUES FOR CLOUD SECURITY MONITORING AND THREAT INTELLIGENCE

(71) Applicant: Oracle International Corporation, Redwood Shores, CA (US)

(72) Inventors: Ganesh Kirti, San Jose, CA (US); Rohit Gupta, Redwood City, CA (US); Kamalendu Biswas, San Ramon, CA (US); Ramana Rao Satyasai Turlapati, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 17/174,673

(22) Filed: Feb. 12, 2021

(65) Prior Publication Data

US 2021/0168167 A1    Jun. 3, 2021

Related U.S. Application Data

(63) Continuation of application No. 15/632,174, filed on Jun. 23, 2017, now Pat. No. 10,958,679, which is a (Continued)

(51) Int. Cl.
  H04L 9/40 (2022.01)
(52) U.S. Cl.
  CPC ...... H04L 63/1441 (2013.01); H04L 63/1416 (2013.01); H04L 63/1425 (2013.01); H04L 63/20 (2013.01)
(58) Field of Classification Search
  CPC ..... H04L 63/20; H04L 63/10; H04L 63/1408; H04L 63/1416; H04L 63/0263;
  (Continued)

(56) References Cited

U.S. PATENT DOCUMENTS 7,603,452 B1    10/2009  Guo
7,647,622 B1 *   1/2010  Sobel ................. H04L 63/1425
                                          709/229

(Continued)

FOREIGN PATENT DOCUMENTS

CA          2953394        12/2015
CN         103180862        6/2013

(Continued)

OTHER PUBLICATIONS

Japanese Application No. 2018-544782, Notice of Decision to Grant dated Nov. 30, 2021, 5 pages (3 pages of Original Document and 2 pages of English Translation).

(Continued)

*Primary Examiner* — Tae K Kim
(74) *Attorney, Agent, or Firm* — Kilpatrick Townsend & Stockton LLP

(57) ABSTRACT

Systems and methods for cloud security monitoring and threat intelligence in accordance with embodiments of the invention are disclosed. In one embodiment, a process for monitoring and remediation of security threats includes generating a threat model using a first portion of activity data, identifying, based upon the threat model, a threat using a second portion of activity data, selecting a security policy to implement in response to the identified threat, identifying cloud security controls in a remotely hosted cloud application server system to modify in accordance with the selected security policy, establishing a secure connection to the remotely hosted cloud application server system using login credentials associated with a tenant account with the cloud application, and sending instructions to the remotely hosted cloud application server system to set the identified cloud security controls with respect to the tenant account in accordance with the selected security policy.

20 Claims, 12 Drawing Sheets

Related U.S. Application Data continuation of application No. 14/523,804, filed on Oct. 24, 2014, now Pat. No. 9,692,789.

(60) Provisional application No. 61/916,070, filed on Dec. 13, 2013.

(58) Field of Classification Search
CPC ............ H04L 63/1425; H04L 63/0227; H04L 63/102; H04L 63/101; H04L 63/107; H04L 63/1433; H04L 63/1441; H04L 63/145; H04L 63/1458; H04L 63/105; H04L 63/14

See application file for complete search history.

(56) References Cited

U.S. PATENT DOCUMENTS

| | | | |
|---|---|---|---|
| 8,495,746 B2 | 7/2013 | Fissel et al. | |
| 9,330,263 B2 | 5/2016 | Cabrera et al. | |
| 9,692,789 B2 | 6/2017 | Kirti et al. | |
| 10,063,654 B2 | 8/2018 | Kirti et al. | |
| 10,200,369 B1 | 2/2019 | Roundy et al. | |
| 10,536,478 B2 | 1/2020 | Kirti et al. | |
| 10,958,679 B2 | 3/2021 | Kirti et al. | |
| 2003/0048174 A1 | 3/2003 | Stevens et al. | |
| 2004/0083178 A1 | 4/2004 | Tanaka et al. | |
| 2005/0188222 A1 | 8/2005 | Motsinger et al. | |
| 2006/0026682 A1 | 2/2006 | Zakas | |
| 2008/0109871 A1* | 5/2008 | Jacobs | H04L 63/20 726/1 |
| 2008/0271143 A1 | 10/2008 | Stephens et al. | |
| 2010/0151816 A1 | 6/2010 | Besehanic et al. | |
| 2010/0180001 A1 | 7/2010 | Hardt | |
| 2010/0199345 A1* | 8/2010 | Nadir | H04L 63/14 726/22 |
| 2010/0251329 A1* | 9/2010 | Wei | H04L 67/1001 726/1 |
| 2010/0268570 A1 | 10/2010 | Rodriguez et al. | |
| 2011/0167469 A1 | 7/2011 | Letca et al. | |
| 2011/0185055 A1 | 7/2011 | Nappier et al. | |
| 2011/0219434 A1* | 9/2011 | Betz | G06F 21/577 726/5 |
| 2012/0030767 A1 | 2/2012 | Rippert, Jr. et al. | |
| 2012/0185913 A1* | 7/2012 | Martinez | H04L 67/51 726/1 |
| 2012/0240183 A1* | 9/2012 | Sinha | H04L 67/306 726/1 |
| 2012/0304249 A1* | 11/2012 | Luo | G06F 21/554 726/1 |
| 2013/0036459 A1 | 2/2013 | Liberman et al. | |
| 2013/0066945 A1* | 3/2013 | Das | G06F 8/60 709/203 |
| 2013/0081065 A1 | 3/2013 | Sharan et al. | |
| 2013/0097701 A1* | 4/2013 | Moyle | H04L 63/1416 726/22 |
| 2013/0111547 A1* | 5/2013 | Kraemer | G06F 21/554 726/1 |
| 2013/0191921 A1* | 7/2013 | Mahaffey | G06F 21/577 726/25 |
| 2013/0254831 A1 | 9/2013 | Roach et al. | |
| 2013/0275574 A1* | 10/2013 | Hugard, IV | H04L 63/20 709/224 |
| 2013/0298192 A1* | 11/2013 | Kumar | H04L 63/1425 726/25 |
| 2014/0006347 A1* | 1/2014 | Qureshi | H04W 12/06 707/783 |
| 2014/0298419 A1* | 10/2014 | Boubez | H04L 63/08 726/4 |
| 2014/0351316 A1* | 11/2014 | Boubez | H04L 63/08 709/218 |
| 2015/0013008 A1 | 1/2015 | Lukacs et al. | |
| 2015/0033285 A1* | 1/2015 | Gao | G06F 21/552 726/1 |
| 2015/0106935 A1 | 4/2015 | Burns et al. | |
| 2015/0135302 A1* | 5/2015 | Cohen | G06F 21/128 726/12 |
| 2015/0172321 A1* | 6/2015 | Kirti | H04L 63/1425 726/1 |
| 2015/0188949 A1* | 7/2015 | Mahaffey | H04L 41/0894 726/1 |
| 2015/0341357 A1 | 11/2015 | Rambur et al. | |
| 2015/0347748 A1 | 12/2015 | Krstic et al. | |
| 2016/0012081 A1 | 1/2016 | Zimmermann et al. | |
| 2016/0057165 A1 | 2/2016 | Thakar et al. | |
| 2016/0112375 A1* | 4/2016 | Cohen | H04L 67/34 726/23 |
| 2016/0255105 A1 | 9/2016 | Palazzo et al. | |
| 2017/0063886 A1 | 3/2017 | Muddu et al. | |
| 2017/0244740 A1 | 8/2017 | Mahabir et al. | |
| 2017/0295191 A1 | 10/2017 | Choi et al. | |
| 2018/0255010 A1 | 9/2018 | Goyal et al. | |
| 2020/0153855 A1 | 5/2020 | Kirti et al. | |

FOREIGN PATENT DOCUMENTS

| | | |
|---|---|---|
| CN | 104246785 | 12/2014 |
| EP | 3080741 | 3/2018 |
| JP | 2011076188 | 4/2011 |
| JP | 2015222471 | 12/2015 |
| WO | 2014052892 | 4/2014 |
| WO | 2014138120 | 9/2014 |
| WO | 2015088702 | 11/2015 |
| WO | 2017/147525 | 8/2017 |

OTHER PUBLICATIONS

U.S. Appl. No. 16/741,501, Notice of Allowance dated Jan. 20, 2022, 19 pages.
Chinese Application No. 201780013155.0, Supplementary Search Report dated May 26, 2021, 1 page, English translation of references cited.
India Application No. IN8632/DELNP/2015, First Examination Report dated Jul. 7, 2020, 20 pages.
Japanese Application No. No. 2018-544782, Office Action dated May 11, 2021, 7 pages, 1 page English translation references cited, 6 pages original.
U.S. Appl. No. 16/741,501, Non-Final Office Action dated Mar. 23, 2021, 35 pages.
Artificial Neural Network, Wikipedia, Available online at: https://en.wikipedia.org/wiki/Artificial_neural_network, Accessed from Internet on May 29, 2017, 22 pages.
Decision Tree Learning, Wikipedia, Available online at: https://en.wikipedia.org/wiki/Decision_tree_learning, Accessed from Internet on May 29, 2017, 9 pages.
Girvan-Newman Algorithm, Wikipedia, Available online at: https://en.wikipedia.org/wiki/Girvan%E2%80%93Newman_algorithm, Accessed from Internet on May 29, 2017, 2 pages.
Instantly Start Monitoring the Cybersecurity Health of Any Organization, Security Scorecard, Available online at: https://securityscorecard.com/, Accessed from Internet on May 29, 2017, 15 pages.
Linear Regression, Wikipedia, Available online at: https://en.wikipedia.org/wiki/Linear_regression., Accessed from Internet on May 29, 2017, 1 page.
MCL—A Cluster Algorithm for Graphs, Available online at: https://micans.org/mcl/, Accessed from Internet on Jun. 5, 2017, 1 page.
Ransomware Tracker, The Swiss Security Blog, Available online at: http://www.abuse.ch/, Accessed from Internet on May 29, 2017, 7 pages.
The New Standard in Business Data, Clearbit, Available online at: https://clearbit.com/, Accessed from Internet on May 29, 2017, 7 pages.
Understanding Risk Levels and Risk Scoring, NetIQ, User Guide, Available online at: https://www.netiq.com/documentation/identity-governance-30/user-guide/data/b1lrobjw.html, Apr. 2018, pp. 1-348.
Wikipedia—The Free Encyclopedia, Available online at: https://www.wikipedia.org/, Accessed from Internet on May 29, 2017, 2 pages.

(56) References Cited

OTHER PUBLICATIONS

Gupta et al., Identification of Effective Public Cloud on User Query, International Journal of Computer Trends and Technology (IJCTT), vol. 4, No. 7, Jul. 7, 2013, 5 pages.
Chinese Patent Application No. CN201780013155.0, Office Action dated Sep. 29, 2020, 14 pages (7 pages of Original document and 7 pages of English Translation).
European Patent Application No. EP14868736.1, Extended European Search Report dated May 15, 2017, 5 pages.
International Application No. PCT/US2014/065523, International Preliminary Report on Patentability dated Jun. 23, 2016, 12 pages.
International Application No. PCT/US2014/065523, International Search Report and Written Opinion dated Feb. 23, 2015, 12 pages.
International Application No. PCT/US2017/019508, International Preliminary Report on Patentability dated Sep. 7, 2018, 7 pages.
International Application No. PCT/US2017/019508, International Search Report and Written Opinion dated May 2, 2017, 10 pages.
U.S. Appl. No. 14/523,804, Non-Final Office Action dated Sep. 27, 2016, 37 pages.
U.S. Appl. No. 14/523,804, Notice of Allowance dated Apr. 5, 2017, 11 pages.
U.S. Appl. No. 14/749,522, Final Office Action dated Sep. 25, 2017, 27 pages.
U.S. Appl. No. 14/749,522, Non-Final Office Action dated Jan. 12, 2017, 20 pages.
U.S. Appl. No. 14/749,522, Notice of Allowance dated Apr. 12, 2018, 13 pages.
U.S. Appl. No. 15/441,154, Final Office Action dated Apr. 15, 2019, 44 pages.
U.S. Appl. No. 15/441,154, Non-Final Office Action dated Oct. 19, 2018, 39 pages.
U.S. Appl. No. 15/441,154, Notice of Allowance dated Aug. 28, 2019, 20 pages.
U.S. Appl. No. 15/632,174, Final Office Action dated Feb. 12, 2020, 17 pages.
U.S. Appl. No. 15/632,174, Non-Final Office Action dated Aug. 14, 2019, 13 pages.
U.S. Appl. No. 15/632,174, Non-Final Office Action dated Feb. 22, 2018, 37 pages.
U.S. Appl. No. 15/632,174, Non-Final Office Action dated Jun. 29, 2020, 7 pages.
U.S. Appl. No. 15/632,174, Notice of Allowance dated Nov. 16, 2020, 9 pages.
Indian Application No. 201847033802, First Examination Report dated Oct. 28, 2021, 6 pages.
U.S. Appl. No. 16/741,501, Final Office Action dated Sep. 2, 2021, 40 pages.

\* cited by examiner

Incidents

Search Filter

| ID | Cloud App | Category | Assigned to | Created on | Priority | Status |
|---|---|---|---|---|---|---|
| | All | All | All | | All | Open |

| ID | Application | App Instance | Category | Priority | Assigned To | Created On | Details | Remediation Type | Status | Action |
|---|---|---|---|---|---|---|---|---|---|---|
| 1220225 | Box | RI | Security Control | High | kqbokku3fa | 2014-10-23 | Security level lower than recommended | Manual | Open | |
| 1220250 | Box | RI | Security Control | High | kqbokku3fa | 2014-10-23 | Security level lower than recommended | Manual | Open | |
| 1220258 | Box | RI | Anomalous Activity | Medium | | 2014-10-23 | User Behavior Risk Related to Login Activity: Observed for bourne2013@hotmail.com of Box Application and Instance RI on 2014-10-24 | Manual | Open | |
| 1220275 | Box | RI | Anomalous Activity | High | kqbokku3fa | 2014-10-20 | Account bourne2231@hotmail.com of Box application instance RI performed suspicious activities | Manual | Open | |
| 1220292 | Box | RI | Anomalous Activity | High | kqbokku3fa | 2014-10-20 | Account bourne2014@hotmail.com of Box application instance RI performed suspicious activities | Manual | Open | |
| 2840001 | AWS | aws_test | Anomalous Activity | High | kqbokku3fa | 2014-10-20 | Account solomon of AWS application instance aws_test performed suspicious activities | Manual | Open | |
| 1220105 | SFDC | RI | Anomalous Activity | High | Support | 2014-10-09 | Account ellen.schwab@keytech.com of SFDC application instance RI performed suspicious activities | Manual | Open | |
| 12890128 | SFDC | RI | Anomalous Activity | High | Admin | 2014-10-09 | Export: Observed for edward.murali@keytech.com of SFDC Application and Instance RI | Manual | Open | |
| | | | | | | | User Behavior Risk Related to Manage Users Changes: | | | |

*FIG. 8B*

TECHNIQUES FOR CLOUD SECURITY MONITORING AND THREAT INTELLIGENCE

CROSS-REFERENCE TO RELATED APPLICATIONS

The present application is a continuation of U.S. patent application Ser. No. 15/632,714, filed Jun. 23, 2017 entitled "TECHNIQUES FOR CLOUD SECURITY MONITORING AND THREAT INTELLIGENCE" which is continuation of Ser. No. 14/523,804, filed Oct. 24, 2014 and entitled "TECHNIQUES FOR CLOUD SECURITY MONITORING AND THREAT INTELLIGENCE," which claims the benefit of priority to U.S. Provisional Patent Application No. 61/916,070, filed Dec. 13, 2013 and entitled "SYSTEMS AND METHODS FOR CLOUD SECURITY MONITORING AND THREAT INTELLIGENCE." The above-identified patent applications are hereby incorporated by reference in their entirety for all purposes.

BACKGROUND

1. Field of the Art

The present invention relates generally to cloud computing and more specifically to monitoring, threat intelligence and managing security controls for cloud applications.

The "cloud" has come to represent a conglomerate of remotely hosted computing solutions and the term "cloud computing" to refer to various aspects of distributed computing over a network. Various service models include infrastructure as a service (IaaS), platform as a service (PaaS), software as a service (SaaS), and network as a service (NaaS). A "cloud" can also refer to the data store and client application of a single service provider. Cloud applications connect a user's device to remote services that provide an additional functionality or capability beyond what is available solely on the device itself. Cloud application providers such as Box.com and Dropbox synchronize a user's files across different devices and providing sharing and versioning capabilities. Other cloud services such as Office 365 and Docusign facilitate document creation and management. Still other cloud providers include Salesforce.com, Amazon Web Services, and others.

SUMMARY

Systems and methods for cloud security monitoring and threat intelligence in accordance with embodiments of the invention are disclosed. In one embodiment, a cloud security system for monitoring and controlling the security of cloud application accounts includes memory containing an analytics application, a seeder application, and an analytics repository database, and a processor, where the processor is configured by the analytics application to generate a threat model using at least a first portion of stored activity data in the analytics repository database, and identify, based upon the threat model, a threat using a second portion of stored activity data in the analytics repository database, where the processor is also configured by the seeder application to select a security policy to implement in response to the identified threat, identify cloud security controls in at least one remotely hosted cloud application server system to modify in accordance with the selected security policy, establish a secure connection to the at least one remotely hosted cloud application server system using login credentials associated with a tenant account with the cloud application, and send instructions to the at least one remotely hosted cloud application server system to set the identified cloud security controls with respect to the tenant account in accordance with the selected security policy.

In a further embodiment, the memory also contains a data loader application and the processor is configured by the data loader application to establish a secure connection to one of the at least one remotely hosted cloud application server system using the login credentials associated with the tenant account with the cloud application, retrieve activity data associated with the tenant account from the remotely hosted cloud application server system, and store the retrieved activity data in the analytics repository database.

In another embodiment, the activity data is retrieved at predetermined intervals.

In a still further embodiment, the activity data includes information concerning login and logout statistics, IP addresses and devices used to access the cloud service.

In still another embodiment, the activity data includes values that are set for security controls associated with the tenant account.

In a yet further embodiment, the processor is also configured by the data loader application to normalize the retrieved activity data into a common format.

In yet another embodiment, the threat model models user behavior.

In a further embodiment again, the threat model correlates activities across a plurality of cloud applications using user profile information associating a particular user's accounts across the plurality of cloud applications and the user's accounts are associated with the tenant account at each of the cloud applications.

In another embodiment again, the user profile information associating a particular user's accounts across the plurality of cloud applications is retrieved from a user identity repository.

In another additional embodiment, the processor is also configured by the data loader application to determine whether a portion of the activity data matches predefined policy alerts.

In a still yet further embodiment, the processor is also configured by the analytics application to send an alert containing information concerning the identified alert and recommended remediation actions.

In still yet another embodiment, a recommended remediation action prescribes a task to be performed outside of the system and the result of the task is entered into the system.

In a still further embodiment again, a recommended remediation action is to disable a user's account.

In still another embodiment again, the memory also contains an incident remediation application, a recommended remediation action prescribes a task to be performed by the cloud security system, and the processor is also configured by the incident remediation application to perform the task and save the result of the task into memory.

In a still further additional embodiment, the processor is also configured by the seeder application to collect registration information from a tenant.

In still another additional embodiment, the registration information includes an authorization token secured by encryption.

In a yet further embodiment again, the identified cloud security controls include password requirements.

In yet another embodiment again, the memory also includes a cloud crawler application and the processor is also configured by the cloud crawler application to collect software defined security configuration data from the cloud service provider, where the software defined security configuration data includes information describing the configuration of security controls in the cloud application with respect to the tenant account.

In a yet further additional embodiment, the processor is also configured by the cloud crawler application to normalize the software defined security configuration data and enter the normalized data into an application catalog database.

In yet another additional embodiment, the processor being configured to generate a threat model using at least a first portion of stored activity data in the analytics repository database includes the processor being configured to generate a threat model using a machine learning algorithm over the first portion of stored activity data.

In a further additional embodiment again, a process for monitoring and remediation of security threats to cloud applications includes generating a threat model using at least a first portion of stored activity data in an analytics repository database using a cloud security system, identifying, based upon the threat model, a threat using a second portion of stored activity data in the analytics repository database using the cloud security system, selecting a security policy to implement in response to the identified threat using the cloud security system, identifying cloud security controls in at least one remotely hosted cloud application server system to modify in accordance with the selected security policy using the cloud security system, establishing, using the cloud security system, a secure connection to the at least one remotely hosted cloud application server system using login credentials associated with a tenant account with the cloud application, and sending instructions to the at least one remotely hosted cloud application server system to set the identified cloud security controls with respect to the tenant account in accordance with the selected security policy using the cloud security system.

Another additional embodiment again also includes establishing, using the cloud security system, a secure connection to a cloud application hosted by a cloud service provider using login credentials associated with a tenant account with the cloud application, retrieving, using the cloud security system, activity data associated with the tenant account, and storing the retrieved activity data in the analytics repository database using the cloud security system.

In a still yet further embodiment again, the activity data is retrieved at predetermined intervals.

In still yet another embodiment again, the activity data includes information concerning login and logout statistics, IP addresses and devices used to access the cloud service.

In a still yet further additional embodiment, the activity data includes values that are set for security controls associated with the tenant account.

Still yet another additional embodiment also includes normalizing the retrieved activity data into a common format using the cloud security system.

In a yet further additional embodiment again, the threat model models user behavior.

In yet another additional embodiment again, the threat model correlates activities across a plurality of cloud applications using user profile information associating a particular user's accounts across the plurality of cloud applications.

In a still yet further additional embodiment again, the user profile information associating a particular user's accounts across the plurality of cloud applications is retrieved from a user identity repository.

In still yet another additional embodiment again, the process also includes determining whether a portion of the activity data matches predefined policy alerts using the cloud security system.

In another further embodiment, the process also includes sending an alert containing information concerning the identified alert and recommended remediation actions.

In still another further embodiment, a recommended remediation action prescribes a task to be performed outside of the system and the result of the task is entered into the system.

In yet another further embodiment, a recommended remediation action is to disable a user's account.

In another further embodiment again, a recommended remediation action prescribes a task to be performed by the cloud security system, and the process also includes performing the task and saving the result of the task into memory using the cloud security system.

In a further embodiment, the process also includes collecting registration information from a tenant using the cloud security system.

In another embodiment, the registration information includes an authorization token secured by encryption.

In a still further embodiment, the identified cloud security controls include password requirements.

In still another embodiment, the process also includes collecting software defined security configuration data from the cloud service provider using the cloud security system, where the software defined security configuration data includes information describing the configuration of security controls in the cloud application with respect to the tenant account.

In a yet further embodiment, the process also includes normalizing the software defined security configuration data and enter the normalized data into an application catalog database using the cloud security system.

In yet another embodiment, generating a threat model using at least a first portion of stored activity data in the analytics repository database includes generating a threat model using a machine learning algorithm over the first portion of stored activity data.

In a further embodiment again, a process for monitoring and remediation of security threats to cloud applications includes collecting registration information from a tenant using a cloud security system, where the registration information includes an authorization token secured by encryption, establishing, using the cloud security system, a secure connection to a cloud application hosted by a cloud service provider using login credentials associated with a tenant account with the cloud application, collecting software defined security configuration data from the cloud service provider using the cloud security system, where the software defined security configuration data includes information describing the configuration of security controls in the cloud application with respect to the tenant account, retrieving, using the cloud security system, activity data associated with the tenant account, storing the retrieved activity data in an analytics repository database using the cloud security system, generating a threat model using at least a first portion of stored activity data in the analytics repository database using the cloud security system, identifying, based upon the threat model, a threat using a second portion of stored activity data in the analytics repository database using the cloud security system, sending an alert containing information concerning the identified alert and recommended remediation actions, selecting a security policy to implement in response to the identified threat using the cloud security system, identifying cloud security controls in at least one remotely hosted cloud application server system to modify in accordance with the selected security policy using the cloud security system, establishing, using the cloud security system, a secure connection to the at least one remotely hosted cloud application server system using login credentials associated with a tenant account with the cloud application, and sending instructions to the at least one remotely hosted cloud application server system to set the identified cloud security controls with respect to the tenant account in accordance with the selected security policy using the cloud security system.

BRIEF DESCRIPTION OF THE DRAWINGS

FIG. 8B is a user interface screen illustrating a list of risk events across different cloud applications in accordance with embodiments of the invention.

DETAILED DESCRIPTION

Turning now to the drawings, systems and methods for cloud security monitoring and control are illustrated. Tenants are organizations whose members include users of cloud services offered by cloud providers. Users may have individual accounts with cloud providers and tenants may have enterprise accounts with cloud providers that encompass or aggregate a number of individual user accounts. In many embodiments of the invention, a cloud security provider maintains a cloud security monitoring and control system that enables tenants to view information about security controls in the various clouds that they use, review analytics reports, and configure security controls by a pre-set classification level of security. In several embodiments, the cloud security monitoring and control system analyzes information about user activity in one or more clouds using machine learning and other algorithms to perform threat detection and to provide recommendations concerning appropriate responses to different categories of threat. The analytics can include determining models of normal and/or abnormal behavior in user activity and detecting patterns of suspicious activity in one cloud or across multiple clouds. Some patterns may involve detecting the same action or different actions in multiple clouds that are associated with the same user account or IP address. Analytics may also include providing an alert and recommending remedial measures in the cloud(s) in which suspicious activity is detected and/or remedial measures to be taken in clouds other than those showing suspicious activity. Systems and methods for collecting and analyzing information from cloud services are discussed below.

System Architecture

A system for cloud security monitoring and control in accordance with embodiments of the invention includes multiple components that may be located on a single hardware platform or on multiple hardware platforms that are in communication with each other. Components can include software applications and/or modules that configure a server or other computing device to perform processes for cloud discovery and management as will be discussed further below.

Figure 1:
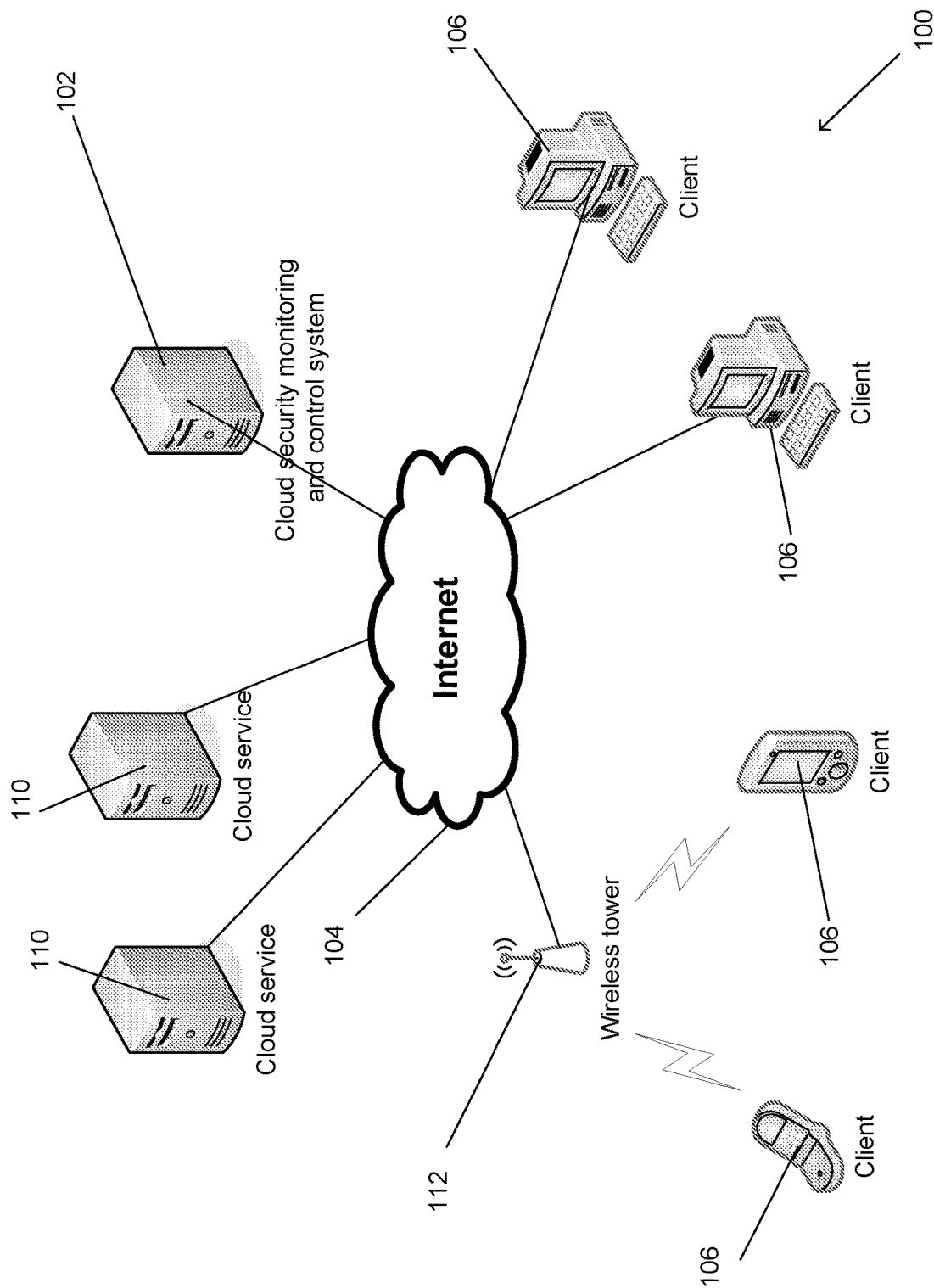
FIG. 1 is a system overview illustrating devices and cloud application service providers that can interact with a cloud security monitoring and control service in accordance with an embodiment of the invention.

A system including a cloud security monitoring and control system 102, client devices 106 that can be used to access the cloud security system 102, and cloud services 110 to be monitored in accordance with embodiments of the invention is illustrated in FIG. 1. The system 100 includes a number of different types of client devices 106 that each has the capability to communicate over a network. The client devices 106 communicate with the cloud security monitoring and control service 102 and present a user interface for interacting with the service. The cloud security and control system 102 can communicate with cloud application services 110 to retrieve security configurations, application data, and other information and set security controls as will be discussed further below.

Figure 2:
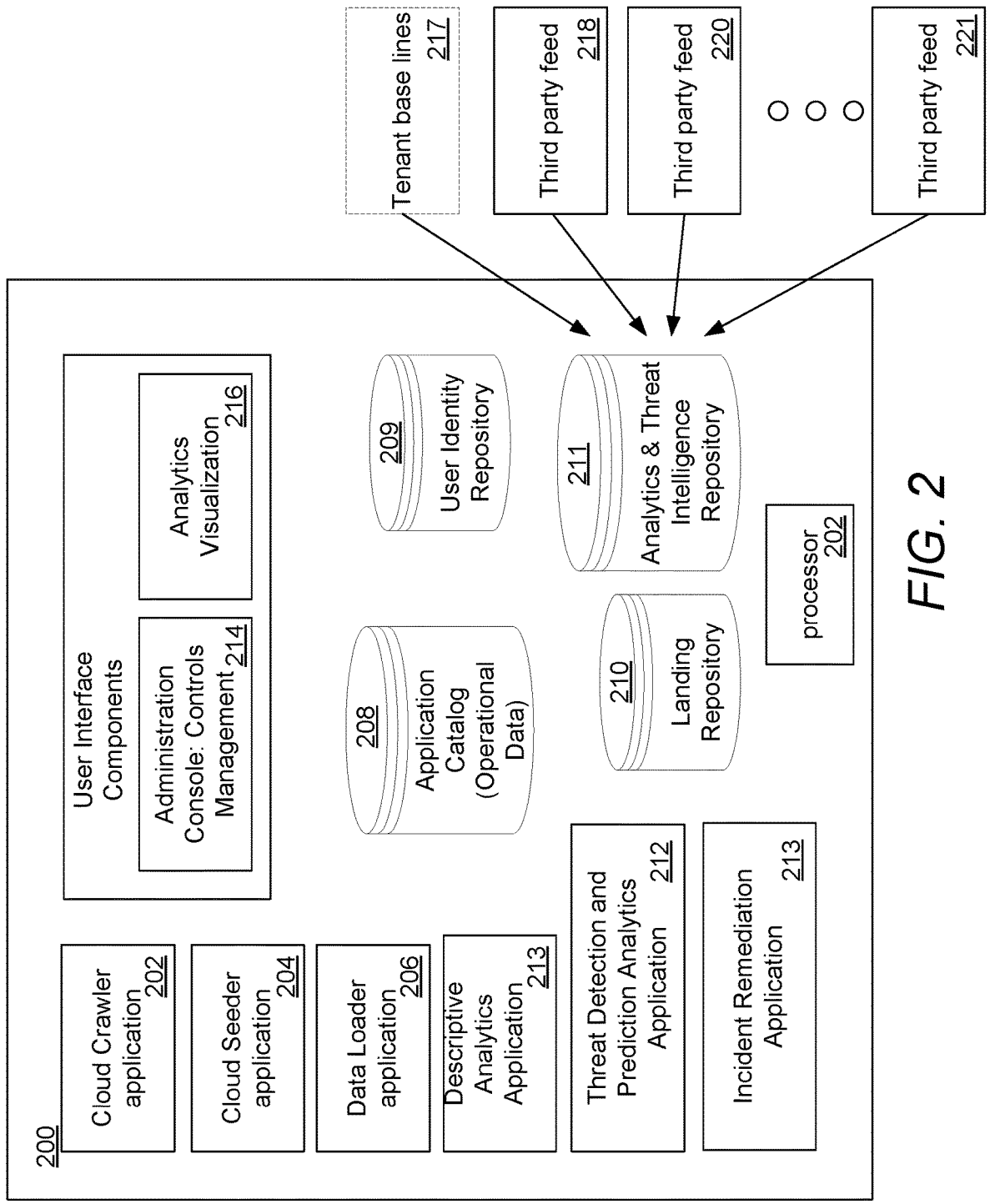
FIG. 2 is a system overview illustrating a cloud security monitoring and control system in accordance with an embodiment of the invention.

In many embodiments of the invention, a system for cloud security includes cloud management applications executing on a hardware platform, user interface components, and data warehouses stored on a hardware platform. A system for cloud security in accordance with embodiments of the invention is illustrated in FIG. 2. Cloud management applications in the system 200 can include a cloud crawler 202, a cloud seeder 204, and a data loader 206. As will be discussed in greater detail further below, a cloud crawler application 202 can retrieve information about security controls from cloud providers, a cloud seeder application 204 can modify the security controls of a tenant account with a cloud provider to reflect a desired security posture, and a data loader application 206 can retrieve activity information on a tenant's account with a cloud provider and generates analytics.

In several embodiments, data retrieved by the cloud crawler application 202 is entered into an application catalog database 208 and data retrieved by the data loader application 206 is entered into a landing repository 210 and/or analytics and threat intelligence repository database 211. The data entered into a landing repository 210 may be in different formats and/or have different ranges of values—this data may be reformatted and/or structured before being moved to the analytics repository 211. The data concerning activity information in the analytics repository 211 can be utilized to generate reports that may be presented visually to a system administrator via a user interface and to generate analytics for determining threat level, detecting specific threats, and predicting potential threats.

The aggregation of activity information in the analytics repository 211 concerning access patterns and other event statistics enables the system to establish baselines of user behavior. Machine learning techniques can then be applied to detect threats and provide recommendations concerning how to respond to threats. Threat models can be developed to detect threats that are known or unknown or emerging. Threats can also be identified by comparing activity data with external threat intelligence information, such as information provided by third-party providers, as will be discussed further below.

The accounts of a particular user in different cloud applications (e.g., different user identities) can be associated together in a user identity repository 209. The user identity repository 209 and/or other memory in the cloud security system can store information concerning tenant accounts and user accounts associated with each tenant account. A user belonging to a tenant organization may have user accounts with various cloud applications. The tenant organization may also have a tenant account with the cloud applications that exercises management authority over the user accounts of users belonging to the organization. The user accounts of a user are typically associated with the tenant account of the tenant to which the user belongs. The association of user accounts to tenant accounts may be used in various ways in accordance with embodiments of the invention including retrieving information about the user activity of users associated with a tenant. As will be discussed further below, a tenant account's credentials may be used to log into cloud application services to retrieve activity data concerning user accounts that are associated with the tenant account.

As will be discussed in greater detail below, the user identity repository 209 can also be utilized to facilitate user tracking and profile across multiple cloud applications. In addition, collecting information about user behavior across multiple cloud services enables the system to, when a threat is detected based upon behavior on one or more cloud services, preemptively alert a system administrator with respect to threats on other cloud services and/or proactively secure other services on which a user maintains data by applying remedial measures, such as adding additional steps to authentication, changing passwords, blocking a particular IP address or addresses, blocking email messages or senders, or locking accounts.

In several embodiments of the invention, the system 200 includes applications or software modules to perform analytics on collected data as will be discussed in greater detail further below. The applications or software modules may be stored in volatile or non-volatile memory and, when executed, configure the processor 201 to perform certain functions or processes. These applications can include a threat detection and prediction analytics application 212 and/or descriptive analytics application 213. The threat detection and prediction analytics application 212 can generate analytics using machine learning and other algorithms to identify and predict security threats from patterns of activity and behavioral models. The descriptive analytics application 213 can generate analytics such as, but not limited to, statistics on users, user activity, and resources. Analytics may be performed using data stored in the analytics and threat intelligence repository 211.

As will be discussed further below, embodiments of the invention may include remediation functions that provide manual and/or automated processes in response to threats. In some embodiments, analytics can utilize information received from tenant systems that describes threat intelligence provided by the tenant. These sources, that can be referred to as customer base lines 217, can include information such as, but not limited to, specific IP addresses to watch or block, email addresses to watch or block, vulnerable browsers or versions thereof, and vulnerable mobile devices or versions of mobile hardware or software. In additional embodiments, analytics can utilize information received from external third party feeds 218, 220, and 221 to augment the threat intelligence by providing external information of security threats such as, but not limited to, identification of infected node points, malicious activity from a particular source IP address, malware infected email messages, vulnerable web browser versions, and known attacks on clouds.

The incident remediation application 213 can be utilized to coordinate and/or perform remediation actions in response to detected threats. It may be called when a recommended remediation action is presented and selected in an alert. The incident remediation application 213 may perform the selected remediation action or instruct another application, such as a cloud seeder application 204 to perform the selected remediation action. When the selected remediation action is to be manually performed or is external to the cloud security system, the incident remediation application 213 may track the status of the remediation action and whether it is complete. The incident remediation application can be used to save the results of a manual or automated remediation action into memory. In several embodiments, a selected remediation action is to be performed by a system external to the cloud security system, such as by a third-party's or a tenant's incident remediation system. In such cases, the incident remediation application 213 may instruct or invoke the third-party's or tenant's incident remediation system to perform the action using an automated integration process.

The cloud seeder application 204 can be utilized to implement security policies by setting security controls within a tenant's accounts in various cloud applications. As will be discussed in greater detail further below, a cloud seeder may set security controls in various conditions such as, but not limited to, part of remediation of a threat or on call by a system user.

In further embodiments of the invention, user interface components include an administration console 214 that provides controls management for a user to set the security controls for one or more clouds and an analytics visualization console 216 for viewing analytics generated by the system. As will be discussed in greater detail further below, the data in the data warehouses can be used to generate the information and reports shown in the user interface. The use of cloud management applications to retrieve security configuration data from cloud applications is discussed below.

Cloud Crawler

Figure 3:
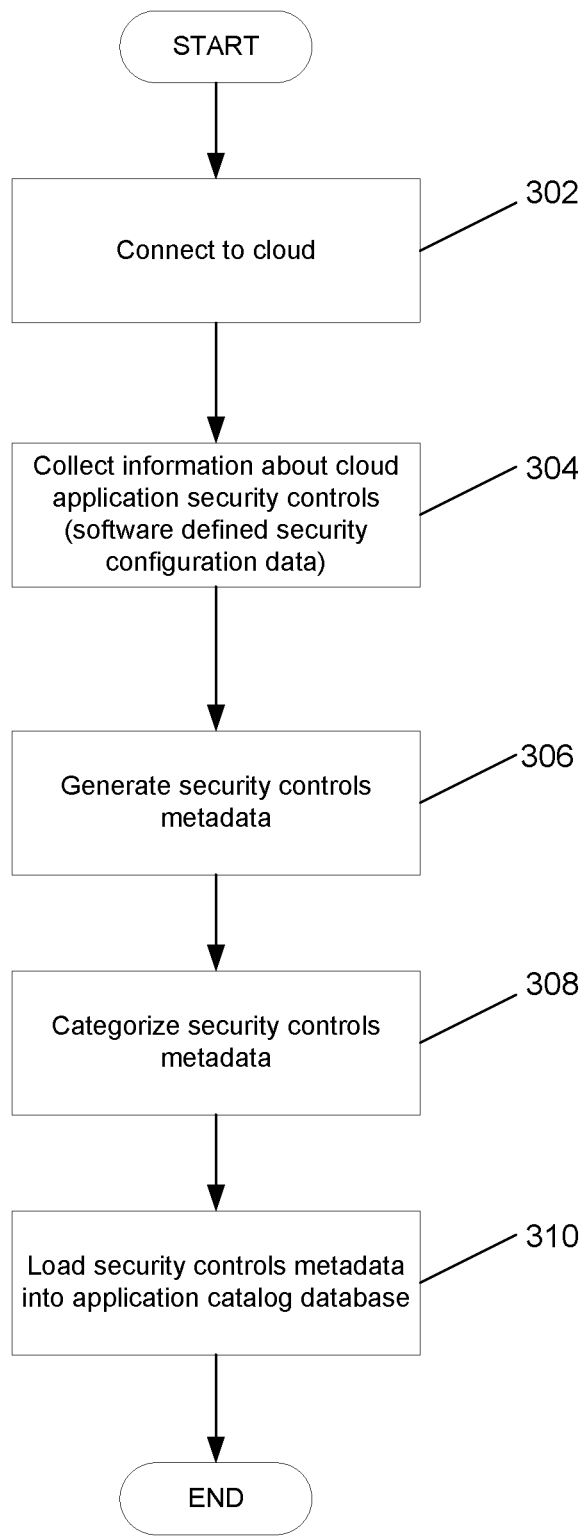
FIG. 3 is a flow chart illustrating a process for retrieving software defined security configuration data from a cloud service in accordance with an embodiment of the invention.

In many embodiments of the invention, a cloud crawler application retrieves software defined security configuration data from cloud services. Software defined security configuration data describes the configuration of security controls in a particular cloud service. Security controls are mechanisms that restrict access to the application and data housed by the cloud. Software defined security configuration data can include data describing: roles that are defined for users, groups and grouping of users, encryption keys, tokens, access controls, permissions, configurations, type of authentication policy, mobile access policy, and many other types of security controls. A process for retrieving software defined security configuration data from cloud services is illustrated in FIG. 3.

The process includes connecting (302) to the cloud. The cloud may require authorization or some other manifestation of consent for access to the system and internal data. Authorization may be provided by a token (such as using the OAuth open standard for authorization) or by credentials (such as a user name and password). One skilled in the art will recognize that there are various other techniques that can be utilized in authorizing access to a cloud provider's system and data. The connection may also include providing a service URL (universal resource locator).

The process further includes collecting (304) software defined security configuration data about the cloud application's security controls. The software defined security configuration data can be collected by utilizing an API (application programming interface) made available by the cloud application. API's and classes of API's that may be utilized in accordance with embodiments may include REST (Representational State Transfer), J2EE (Java 2 Platform, Enterprise Edition), SOAP (Simple Object Access Protocol), and native programmatic methods (such as native application API's for Java). The information could also be requested using other techniques including scripting languages (such as Python and PHP), deployment descriptors, log files, database connectivity through JDBC (Java Database Connectivity) or REST, and resident applications (cloud beacons) as will be discussed further below. The information that is sent or received can be represented in a variety of formats including, but not limited to, JSON (JavaScript Object Notation), XML (Extensible Markup Language), and CSV (Comma Separated Values). One skilled in the art will recognize that any of a variety of formats may be utilized in accordance with embodiments of the invention as suitable to a specific application. Table 1 below provides a partial list of security controls and the access that is supported by the cloud applications Box and Amazon Web Services. Table 2 provides a partial list of security controls and supported access for Salesforce.com.

TABLE 2

| Security Controls | Support in Salesforce.com |
| --- | --- |
| Users/Group Management | SalesForce User/Group/Profiles APIs |
| Credentials and Identifiers | APIs: Setup changes |
| Login/Logout Events | APIs: Audit activity |
| IP address of the clients | APIs: Audit activity |
| Device (iphone, ipad etc) used by the clients | API to manage Setup changes |
| Password Policies | APIs: Setup changes |
| Resource Access Permissions | Salesforce object monitoring using object history |
| Restrict or limit Mobile access | APIs to manage Setup changes |
| Roles | Salesforce Profiles |

The software defined security configuration data received about a cloud application's security controls can be used to generate (306) security controls metadata, that is, normalized descriptors for entering the information into a common database. The security controls metadata is categorized (308) (mapped into categories) and indexed. The categorization may comply with a standard specified by a security organization and/or may be certified and/or audited by a third party. In addition, security controls metadata and/or the categorization of metadata may be formulated around the requirements of a particular regulation or standard. For example, regulations and standards such as the Health Insurance Portability and Accountability Act (HIPAA), Sarbanes-Oxley Act, FedRAMP, and Payment Card Industry Data Security Standard (PCI DSS) may require reporting and audit trails. Security controls metadata can be formatted in a way to display the types of information required by the regulations and standards and facilitate the generation of reports needed.

The security controls metadata is entered (310) into an application catalog database. In many embodiments of the invention, the application catalog database is a Cassandra database. In other embodiments, the application catalog database is implemented in other types of databases appropriate to the application. One of ordinary skill in the art will recognize that any of a variety of databases can be used to store an application catalog in accordance with embodi-

TABLE 1

| Security Controls | Support in Box | Support in Amazon Web Services (AWS) |
| --- | --- | --- |
| Users/Group Management | REST (Representational State Transfer) API | AWS IAM (Identity and Access Management) APIs |
| Credentials and Identifiers | N/A | Secure and monitor Accounts, tokens, keys etc |
| Login/Logout Events | REST API | AWS CloudTrail - Events API and Log files |
| IP address of the clients | REST API | AWS CloudTrail - Events API and Log files |
| Device (iphone, ipad etc) used by the clients | REST API | AWS CloudTrail - Events API and Log files |
| Password Policies | REST API | AWS IAM policies |
| Resource Access Permissions | Resources: Files, Folders Actions: Editing, Preview, upload, collaboration events | Resources: EC2, S3, EBS Actions: Create, Access, Restart, Terminate, etc. IP address based access controls |
| Restrict or limit Mobile access | Limit users from saving content for offline access | AWS IAM policies |
| Roles | BOX has pre-defined admin roles | Roles can be created using pre-defined policies | ments of the invention for later retrieval, report generation, and analytics generation as will be discussed further below.

A specific process for discovering and storing security controls metadata in accordance with an embodiment of the invention is discussed above. Any of a variety of processes for retrieving software defined security configuration data and generating security controls metadata can be utilized in accordance with embodiments of the invention. One skilled in the art will recognize that the number and types of controls and the mechanisms for retrieving software defined security configuration data may vary in different embodiments of the invention as supported by different cloud applications. For example, other cloud applications such as Office 365, GitHub, Workday, and various Google apps may be supported using retrieval mechanisms specific to the application. Furthermore, processes for retrieving software defined security configuration data can be automated or manual based on target cloud provider support.

Controls Management

In many embodiments of the invention, a controls management platform provides a user with a normalized view of controls for multiple clouds. The platform can include a user interface that displays a simplified view of controls for different clouds on the same screen. Information provided to the controls management platform can be retrieved from an application catalog database using metadata based schema mapping. The platform can be used to assign consistent access policies across clouds. Controls can be displayed and/or set according to specified classifiers, such as, but not limited to: standard, stringent, custom. A higher level classification corresponds to more stringent controls. In several embodiments, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In several embodiments of the invention, the controls management platform can also provide for plug-in interfaces to integrate with SaaS, PaaS, and native applications.

Figure 8A:
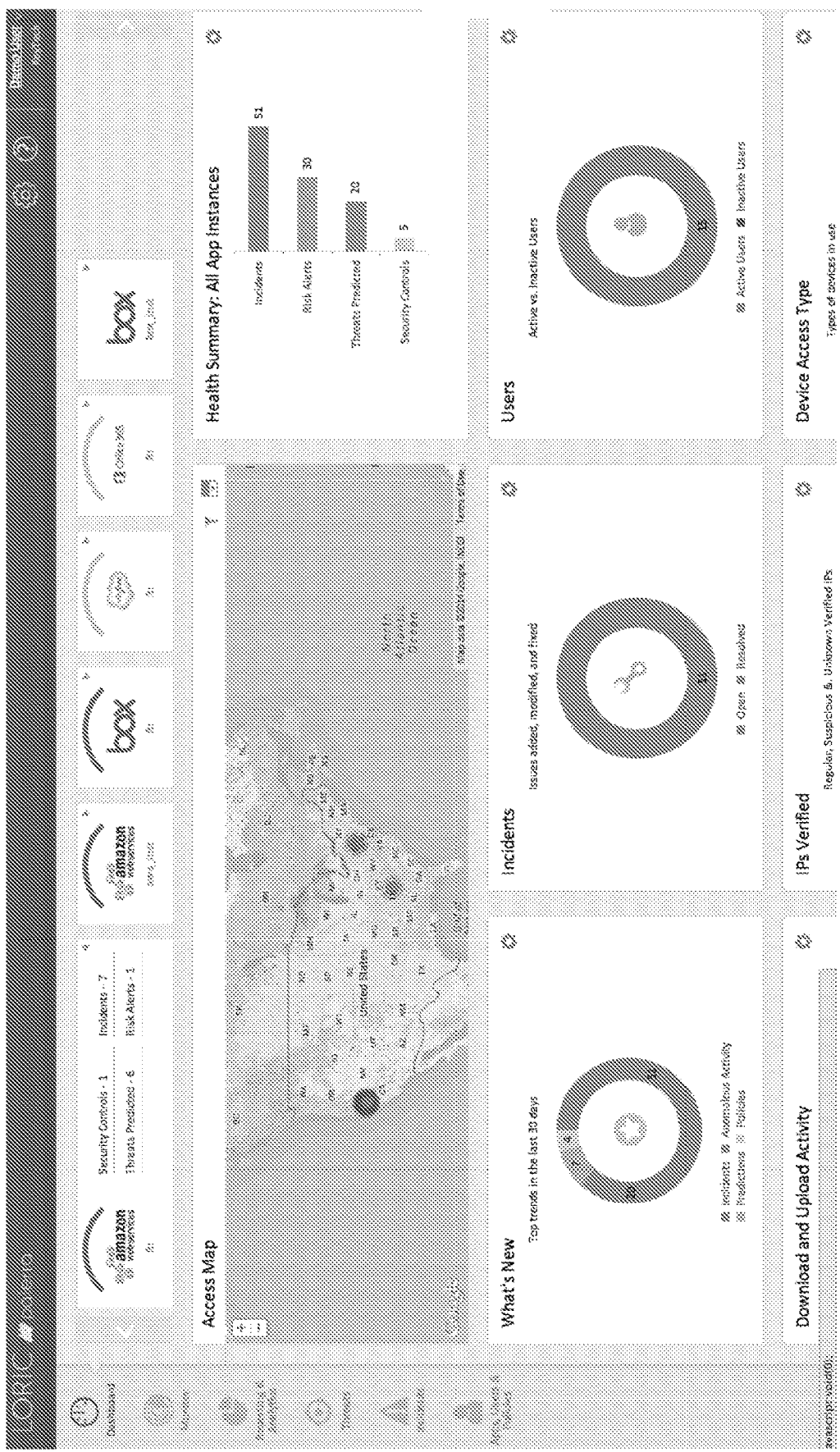
FIG. 8A is a user interface screen illustrating a tenant dashboard view of a controls management platform user interface in accordance with embodiments of the invention.

A controls management platform user interface may display key security indicators in a library format with risk factors that are color coded (such as red, green, yellow). Other statistics or metrics may be displayed such as, but not limited to, user logins attempts, groups with most added users, most deleted files, users with the most deleted files, and users downloading the most files. Some types of information may be specific to a particular cloud application provider, such as Salesforce.com showing who is downloading opportunity/budget data, contracts, or contacts. In several embodiments of the invention, a user interface provides a unified view of security controls for a tenant's registered cloud applications. The user interface may display values set for any or all security controls set for different cloud applications, as well as deviations of the current values from values associated with predetermined policies or configurations. A security policy may include predetermined desirable or recommended values for security controls as will be discussed further below. A user interface may also display events and alerts concerning detected security threats and risks and tools to address them as will be discussed further below. A user interface can provide control over setting security controls values, such as by pushing a security policy using a cloud seeder as will be discussed further below. A tenant's dashboard view of a controls management platform user interface in accordance with embodiments of the invention is illustrated in FIG. 8A. The dashboard view can display high-level information such as a map of IP addresses of user accounts associated with the tenant's account that have accessed cloud applications, number of risk alerts and predicted threats, number of inactive and active users, number of open and closed incidents, etc. The collection of activity data from cloud application providers is described next.

Cloud Data Loader

Figure 4:
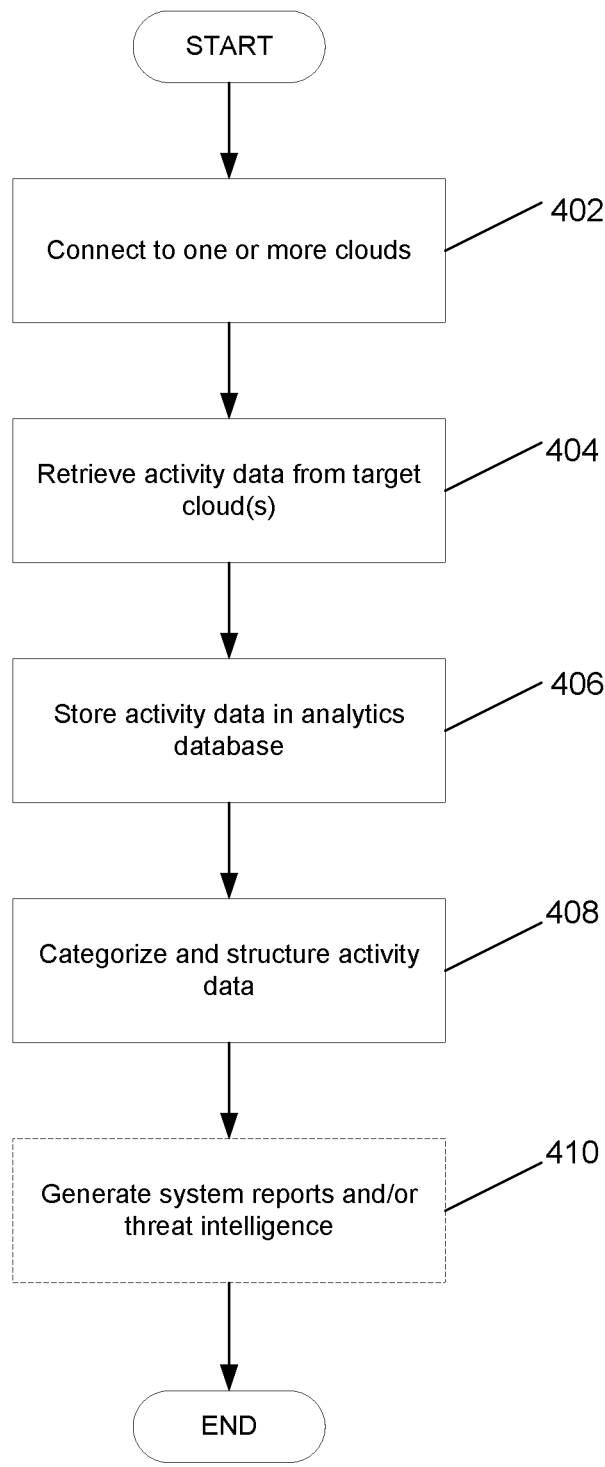
FIG. 4 is a flow chart illustrating a process for collecting activity data from a cloud service in accordance with an embodiment of the invention.

In many embodiments of the invention, a cloud data loader application configures a computing device to collect activity data from a cloud service about a tenant's user activity, security configuration, and other related pieces of information. A process for collecting activity data from a cloud service in accordance with embodiments of the invention is illustrated in FIG. 4.

The process includes connecting (402) to one or more clouds and collecting (404) activity data from the clouds. In many embodiments, the connection is made over an encrypted communication channel. In further embodiments, the connection must be authenticated by a token or using login credentials as in the connection made with a cloud crawler application discussed further above. In several embodiments of the invention, the collection is scheduled to occur periodically (e.g., every 4 hours or every 6 hours). In many embodiments, the schedule for collection is configurable by the tenant. In further embodiments, data is collected and retrieved in real time as events occur utilizing a real-time computation system such as, for example, Storm. The system may be configured to designate certain events or activity as high risk events for retrieval near real-time outside scheduled retrieval.

Activity data can include various types of information made accessible by a remotely hosted cloud application system to a system external to the cloud application system when the external system holds the proper credentials, which may be issued by the cloud application system or another authorizing entity. Activity data associated with user accounts can include information relating to the use of and/or actions taken with a user account at a cloud application. Activity data can include sources of information such as a user log(s) or audit trail(s). More specific types of activity data can include, but are not limited to, login and logout statistics (including attempts and successes), IP addresses used to access the application, devices used to access the application, and cloud resources that were accessed (including, but not limited to, files and folders in a file management cloud application [such as Box], employees and contractors in a human resource cloud application [such as Workday], and contacts and accounts in a customer relationship management cloud application [such as Salesforce]). Activity data can include the user account or other user identifier for the user associated with the events or statistics. Activity data can include information about system status or activity of a cloud application system such as, but not limited to, server activity, server reboots, security keys used by a server, and system credentials, where this information is visible or accessible to a system using authorized credentials.

Activity data may also include information about the security configuration of a tenant (and associated users) account. Security configuration can include the values to which security controls (discussed further above) for a tenant (and/or associated users) are set.

In some embodiments, certain events are considered high risk and activity data related to such events are retrieved near real-time outside of a scheduled interval.

The retrieved activity data is stored (406) in an analytics and threat intelligence repository database 211. The analytics and threat intelligence repository database 211 may be any database or data repository with query capability. In several embodiments of the invention, the analytics and threat intelligence repository database 211 is built in a NoSQL based infrastructure such as Cassandra or other distributed data processing system, although any data warehouse infrastructure may be utilized as appropriate for the application. In some embodiments, the data is first entered into a landing repository 210 and reformatted and/or structured before being moved to an analytics repository 211.

In some embodiments of the invention, the data may be received in different formats that are utilized by different cloud applications. For example, the data may be formatted in JSON (JavaScript Object Notation) or other data interchange formats, or may be available as log files or database entries. In further embodiments, the process includes normalizing (408) the data and reformatting the data into a common format for storage in and retrieval from the analytics and threat intelligence repository database 211. Reformatting the data may include categorizing and structuring the data into the common format. In several embodiments of the invention, the database is adaptive to structural changes and new values by running automated processes to check for changed data. In some embodiments, a cloud crawler application (as discussed further above) recognizes differences in the structure or values of the data retrieved and the changes are implemented in the application catalog database 208 and/or analytics and threat intelligence repository database 211. System reports may be pre-generated (410) by jobs that are scheduled to run on the data set. Specific processes for utilizing a cloud loader application to collect activity data are discussed above. Any of a variety of processes can be used for collecting activity data in accordance with embodiments of the invention. Reports that can be pre-generated or generated on demand by a system user or administrator in accordance with embodiments of the invention are discussed below.

Reports

Data stored in an application catalog database and/or analytics and threat intelligence repository database 211 can be used to generate a variety of reports. Categories of reports can include: authentication and authorization, network and device, systems and change data, resource access and availability, malware activity, and failures and critical errors. Reports can be based on various attributes such as, but not limited to, per application, per user, per secured resource, and per device used for access. Reports may highlight recent changes such as updated features in a cloud application or newly modified policies. Reports may be pre-generated by scheduled jobs (e.g., for performance reasons) or may be requested by a user or administrator.

In various embodiments of the invention, reports include analytics generated on the data. Analytics may utilize Apache Software Foundation technologies such as Hadoop, Hive, Spark, and Mahout or other features as available in the data storage framework used. Several embodiments utilize the R programming language to generate analytics. In further embodiments, the generation of analytics includes the use of machine learning algorithms, proprietary algorithms, and/or external threat intelligence from external commercial sources such as FireEye and Norse or public threat intelligence communities such as Zeus and Tor. Techniques for generating analytics in accordance with embodiments of the invention are discussed below.

Analytics and Security Intelligence

Figure 5:
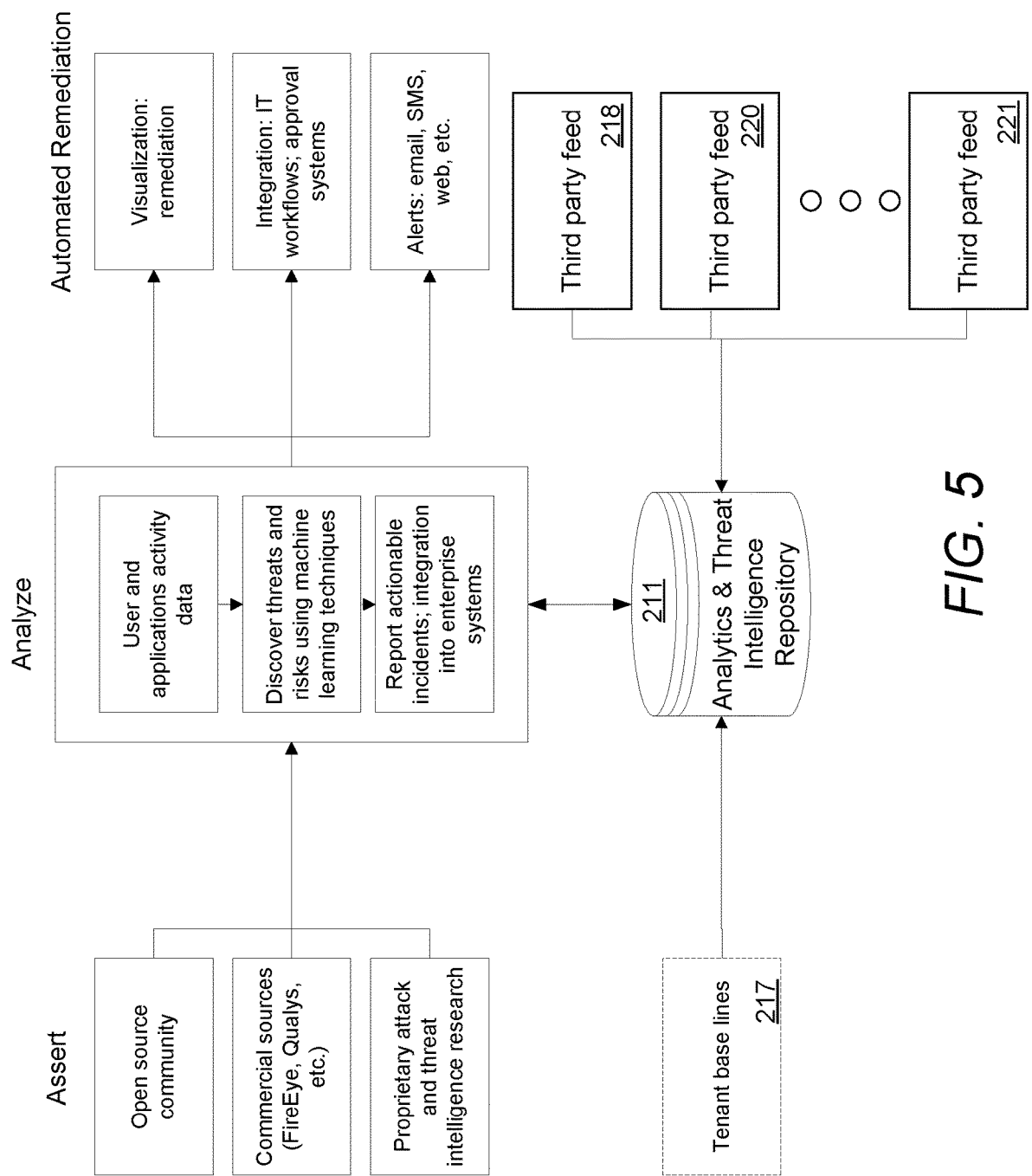
FIG. 5 conceptually illustrates components of a threat intelligence platform for generating analytics in accordance with an embodiment of the invention.

A cloud security monitoring and control system in accordance with embodiments of the invention can generate analytics using collected data. Analytics may be generated by an analytics process and/or an analytics module referred to as an analytics engine. An overview of generating analytics using components of a threat intelligence platform in accordance with embodiments of the invention is illustrated in FIG. 5.

One class of analytics that may be generated is descriptive or statistical analytics. Statistical data can be generated using a pre-defined set of system queries, such as, but not limited to, MapReduce jobs and Spark and Apache Hive queries. Descriptive analytics can be generated either for a single application or across multiple applications using correlation techniques. Examples of reports that can be generated include, but are not limited to, login statistics (e.g., users with the most failed logins, IP address based login history including consideration of IP reputation, geolocation, and other factors), user statistics (e.g., users with the most resources [files, EC2 machines, etc.], entitlements across clouds, number of changed passwords), activity statistics (e.g., activity of a user across clouds), statistics on key rotation (e.g., whether SSH keys have been rotated within the last 30 days), and resource statistics (e.g., number of folders, files downloaded by users, files downloaded by roaming or mobile users). Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, but not limited to, deviations from base line expectations, rare and infrequent events, and behavior analytics to derive suspicious behavior of a user. Algorithms and profiles can be trained to intelligently predict whether an unusual behavior is a security risk. Third party feeds from providers such as, but not limited to, MaxMind, FireEye, Qualys, Mandiant, AlienVault, and Norse STIX can be integrated to augment the threat intelligence by providing external information of and relating to potential security threats such as, but not limited to, IP (Internet Protocol) address reputation, malware, identification of infected node points, vulnerable web browser versions, use of proxy or VPN server by a user, and known attacks on clouds. In several embodiments, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file access, sales transactions, or instances of virtual machines. In many embodiments of the invention, various types of algorithms can be particularly useful for analyzing the data. Decision tree, time series, naive Bayes analysis, and techniques used to build user behavior profiles are examples of machine learning techniques that can be utilized to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity in one cloud or across multiple clouds over a series of time. As discussed further above, activity data from different clouds may be in different formats or with different possible values or ranges of values. Normalizing the data in the processes discussed above may include reformatting the data such that it is comparable, have the same meaning, and/or bear the same significance and relevance between different clouds. Thus, algorithms can aggregate and compare data from different clouds in meaningful ways. For example, a series of failed logins with a particular user account in one cloud may be deemed not to be a threat. However, a series of failed logins with user accounts associated with a user across multiple clouds may indicate a concerted effort to crack the user's password and therefore set off an alarm. Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In several embodiments of the invention, data collected over time is used to build models of normal behavior (e.g., patterns of events and activity) and flag behavior that deviates from normal as abnormal behavior. After one or more flagged event or activity is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over period of time can be used with machine learning algorithms to generate patterns referred to as user behavior profiles. The activity data can include contextual information such as IP address and geographic location.

Algorithms for association rule learning can be used to generate recommendations. In several embodiments of the invention, profile linking algorithms are used to link activities across multiple cloud applications by finding cross application correlation. A single user can be identified across multiple clouds using one or more attributes or identification factors, such as a primary user identifier (ID) that is commonly used across the clouds or a single sign-on (SSO) authentication mechanism (e.g., Active Directory, Okta). Correlation of activities across applications can include finding users with a first entitlement in a first cloud application that have a second entitlement in a second cloud application, users logged into two cloud applications simultaneously from different IP addresses, users who have several failed login attempts and then change their password, and common users with numerous failed logins in two cloud applications.

In many embodiments of the invention, a user identity repository 109 can be utilized to facilitate user tracking and profile across multiple cloud applications. A particular user's accounts in different cloud applications may be linked by associating together the user identifier associated with the accounts (e.g., jdoe, john.doe, etc.), by a primary (universal) user identifier or SSO mechanism as mentioned above, or other method. A user identity repository 109 can contain information relating together the accounts of each user associated with a tenant. A user who utilizes multiple cloud application accounts that under the control or ownership of a tenant may be referred to as an "enterprise user."

In several embodiments of the invention, a recommendation engine tracks user activity for anomalous behavior to detect attacks and unknown threats. The recommendation engine can track user activity across multiple clouds for suspicious events. Events can include pre-defined at-risk operations (e.g., downloading a file containing credit card numbers, copying encryption keys, elevating privileges of a normal user). An alarm can be sounded with details of the event and recommendations for remediation.

Dynamic policy based alerts can be generated for events pertaining to a specific user/employee. A process can monitor activity data associated with the specific user and generate a customized alert for specific actions taken by the user.

In many embodiments of the invention, an algorithm is designed to simulate normal user activities using user activity data in the analytics and threat intelligence repository database 211. The simulation can be used to train other machine learning algorithms to learn normal behavior of a user in the system. In general, a particular security issue may not always repeat, and hence may not be detected by a purely supervised algorithm. However, techniques such as outlier detection establish a baseline that is useful for detecting anomalous activities. Such anomalous activities along with contextual threat intelligence can provide more accurate prediction of threats with low prediction errors.

In further embodiments of the invention, analytics can be used to detect security controls drift, which can refer to the changing of one or more security controls in a seemingly arbitrary manner that can increase security risks. A risk event can be generated in response to the change of one or more security controls in one or more cloud applications and actionable intelligence associated with the risk event. As with other types of events, an alert may be sent to a tenant, tenant system, or other monitoring entity. For example, a tenant's password policy in a cloud application may have been changed to impose fewer requirements (e.g., type and/or number of characters). This may generate a risk event and alert to recommend that the password policy be changed back to the original password policy.

Alerts concerning any of the events discussed above can be shown on a user interface such as a controls management platform discussed further above. An alert can include information about the detected event such as, but not limited to, an event identifier, date, time, risk level, event category, user account and/or security controls associated with the event, cloud application associated with the event, description of the event, remediation type (e.g., manual or automatic), and/or event status (e.g., open, closed). A user interface showing a list of risk events across different cloud applications associated with a tenant's account in accordance with embodiments of the invention is illustrated in FIG. 8B. Information to be displayed about each risk event can include an identifier (ID), affected cloud application and instance, category, priority, date and time, description, recommended remediation type, and status. Each risk event may also have a user-selectable action, such as editing, deleting, marking status complete, and/or performing a remediation action. Selection of a remediation action may invoke an application such as the incident remediation application 213 and/or cloud seeder application 204 to perform the selected remediation.

Figure 8C:
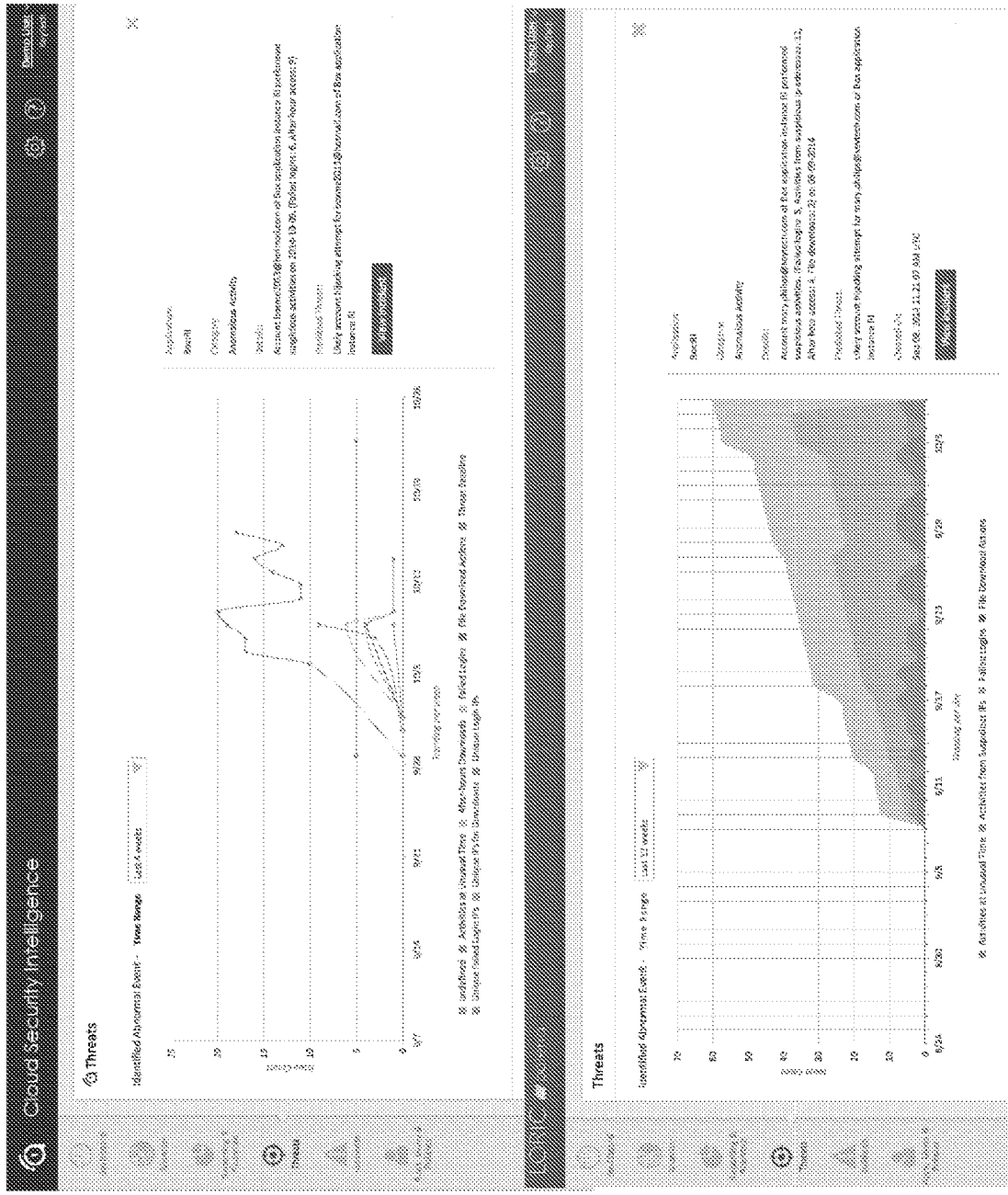
FIG. 8C is a user interface screen displaying a graphical chart of events in accordance with embodiments of the invention.

Counts of events in different event categories over time can be graphically illustrated in a chart. A user interface displaying a chart of events in accordance with embodiments of the invention is illustrated in FIG. 8C. The chart displays a count of events by date in each of the color coded categories such as activities at an unusual time, after-hours downloads, failed logins, etc. The visual representation (e.g., a line) of an event category can be toggled on and off.

Figure 8D:
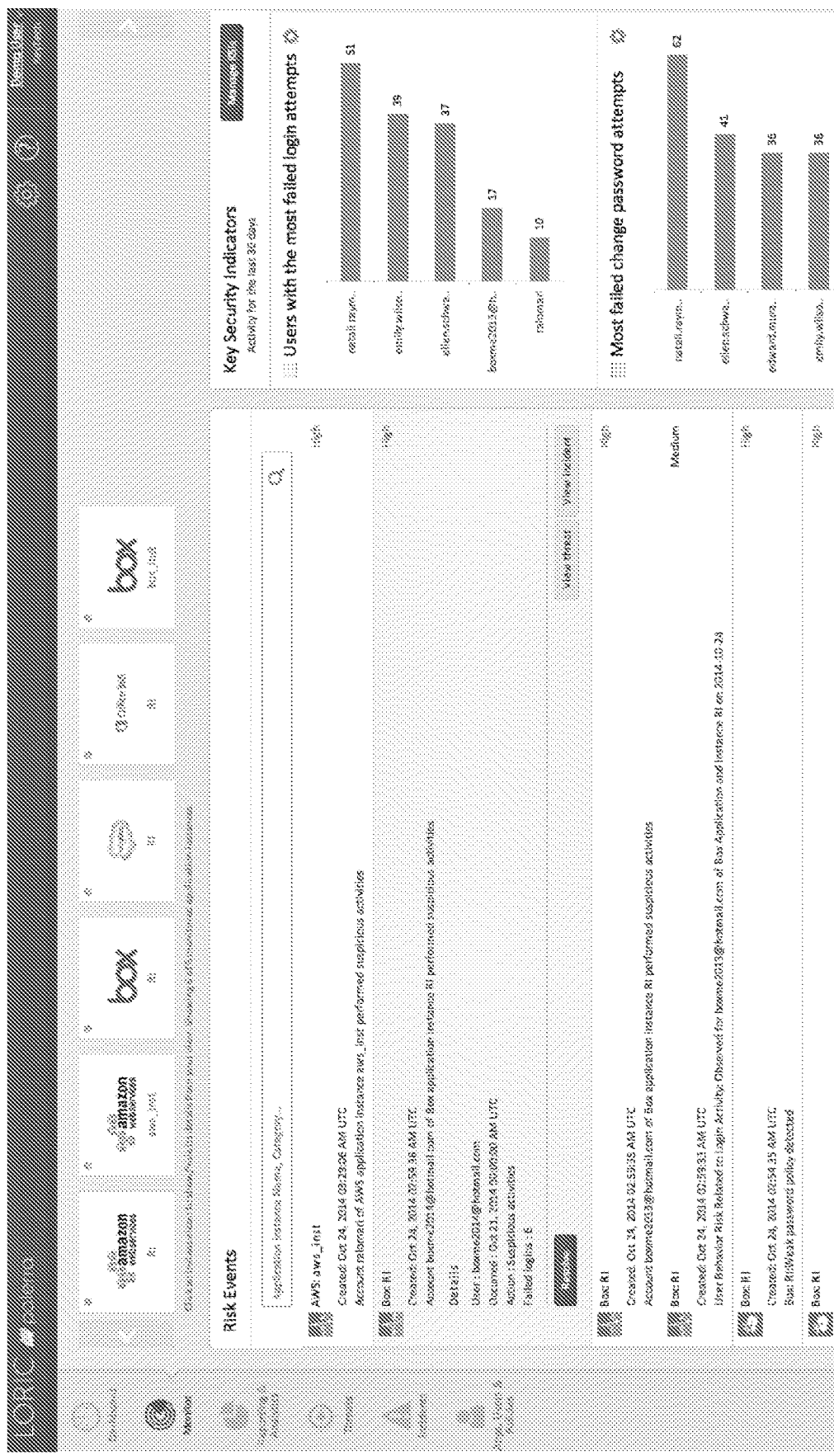
FIG. 8D is a user interface showing various summary views of risk events in accordance with embodiments of the invention.

Threats can also be displayed in a summary view. A user interface showing various summary views of risk events in accordance with embodiments of the invention is shown in FIG. 8D. One window lists risk events showing information similar to the view illustrated in FIG. 8B. A second window shows Key Security Indicators as users with a high count of certain risk events, such as failed login attempts, failed change password attempts, etc.

Specific processes for retrieving and analyzing activity data in accordance with an embodiment of the invention are discussed above. Any of a variety of processes for retrieving and analyzing activity may be utilized in accordance with embodiments of the invention. Processes for the remediation of identified threats are discussed below.

Remediation

Figure 6:
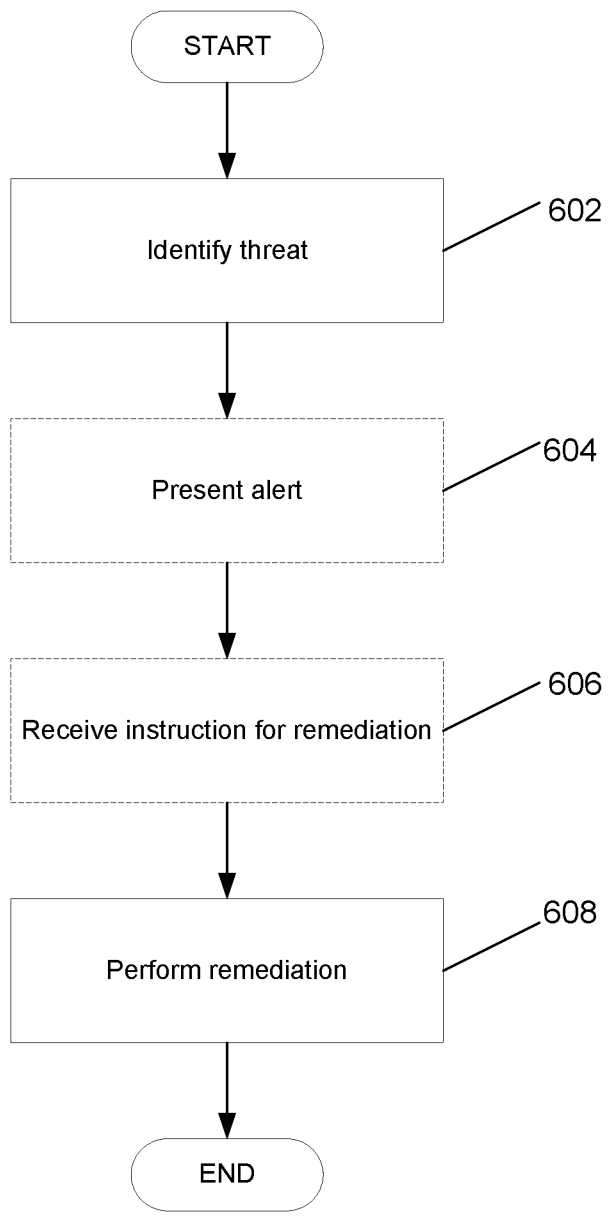
FIG. 6 is a flow chart illustrating a process for remediating a threat in accordance with an embodiment of the invention.

Identified threats can be addressed by a variety of techniques in accordance with embodiments of the invention. Remediation of threats may be automated or manual, soliciting user or administrator involvement. A process for remediating threats in accordance with embodiments of the invention is illustrated in FIG. 6.

The process includes identifying (602) a threat. Threats may be identified using processes such as the analytics and security intelligence processes discussed further above. Threats can include activity, events, or security controls that are abnormal or noncompliant. An alert is presented (604) regarding the identified threat. In many embodiments of the invention, an alert may be visual and may appear in a user console such as a controls management platform discussed further above. In several embodiments, an alert is communicated over a network such as by email, short message service (SMS) or text messaging, or web-based user console. Alerts may be communicated as secure messages (e.g., over a secure communication channel or requiring a key or login credentials to view). An alert may contain information concerning recommended or available remediation action(s), such as implementing stronger security controls, and request a selection of which remediation action(s) to pursue.

In many embodiments, a system for cloud security can interface with third party incident management automation systems such as, but not limited to, ServiceNow and IBM QRadar. External systems may support an API (application programming interface) for interaction. An alert and/or other information concerning an identified threat can be sent to an entity external to the cloud security system such as a tenant's internal IT (information technology) workflow management system or third party incident management automation system for remediation and/or tracking. The external system may return a status (e.g., complete or not complete) to the cloud security system. In this way, remediation may be delegated to an external system with the results reported back to the cloud security system to "close the loop." For example, if a password reset is desired for a user account, the cloud security system can send an alert or message to a tenant's internal IT system managing the user account. An administrator or system may complete the password reset operation and report the status as completed back to the cloud security system. Remediation action(s) to address a threat may be performed automatically, if a response to such threats is predetermined, or may be instructed (606) by a user selecting a remediation option from the alert that was presented.

The selected remediation action(s) are performed (608). Any of a variety of security measures may be taken to address an identified threat such as, but not limited to, deactivating an account, resetting a password, or setting stronger security controls. In many embodiments, the cloud security system performs remedial actions by carrying out recommended measures directly and automatically with use of any agent or proxy.

In some embodiments, remedies may be performed "offline" or outside of visibility of the cloud security monitoring and control system. For example, an alert notifies an administrator, who then makes changes to an external system in which the monitoring and control system does not have visibility. In such cases, an actionable incident can be opened in the monitoring and control system as an open item that can be later set to closed when the changes are completed. Remediation may also include utilizing an incident remediation application 213 to coordinate and/or perform remediation actions and/or a cloud seeder application 204 or process to set security controls as discussed further below.

Specific processes for identification and remediation are discussed above. Any of a variety of processes for identifying and remediating threats can be utilized in accordance with embodiments of the invention. Remediation may include setting the security controls of a tenant's cloud application account. Provisioning a cloud application account with designated security controls is discussed below.

Cloud Seeder

Figure 8E:
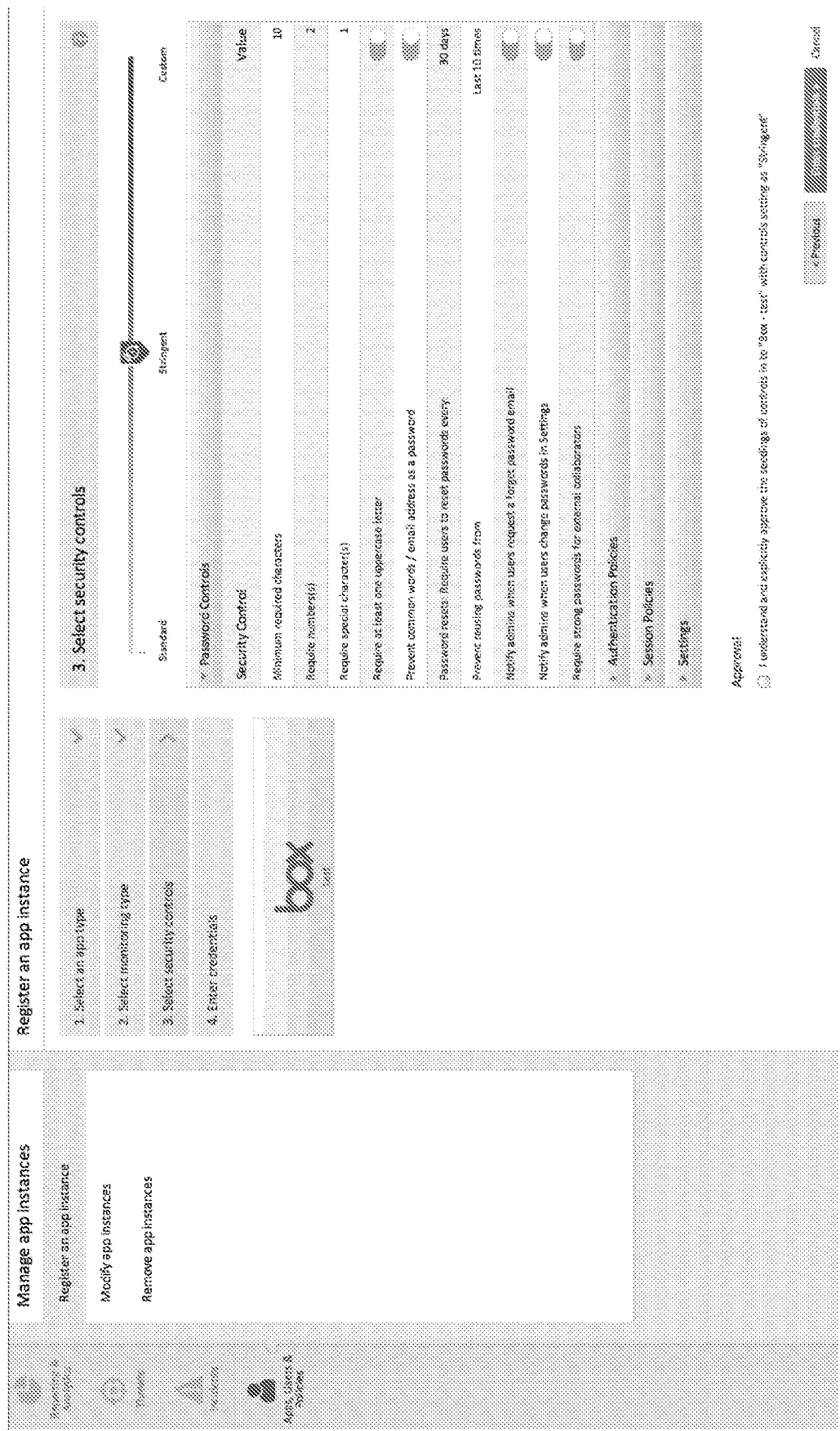
FIG. 8E is a user interface screen showing security controls for a tenant's account with a cloud application and the assignment of security control values at a security level in accordance with embodiments of the invention.

In many embodiments of the invention, a cloud seeder application configures a computing device to provision a cloud application for a tenant with the tenant's desired security posture or security policy. The security posture/policy may include setting security controls to particular values that are associated with a particular level of security. The security posture/policy may be implemented with respect to controls that are specific to one user, or controls that apply to a group of users or all users. The seeder application may be used to coordinate consistent access policies across clouds. In several embodiments, security controls are coordinated across several accounts that a tenant has among different cloud providers. For example, different levels of security may be defined such that when a higher or lower level of security is selected, the security controls for a tenant's accounts with different cloud services are all set to reflect a higher or lower level of security. In this way, a unified policy and security controls configuration can be enforced. The values for various security controls at different levels of security can be defined by input on a user interface such as a controls management platform discussed further above and the values associated with the security controls at each level of security stored in a database. A user interface showing security controls for a tenant's account with a cloud application and the assignment of security control values at a security level in accordance with embodiments of the invention is illustrated in FIG. 8E. In the illustrated embodiment, security controls at a Stringent level of security include password requirements for a user account such as ten minimum characters, two numbers, one special character, one uppercase letter, no reuse of the last ten passwords, etc.

Figure 7:
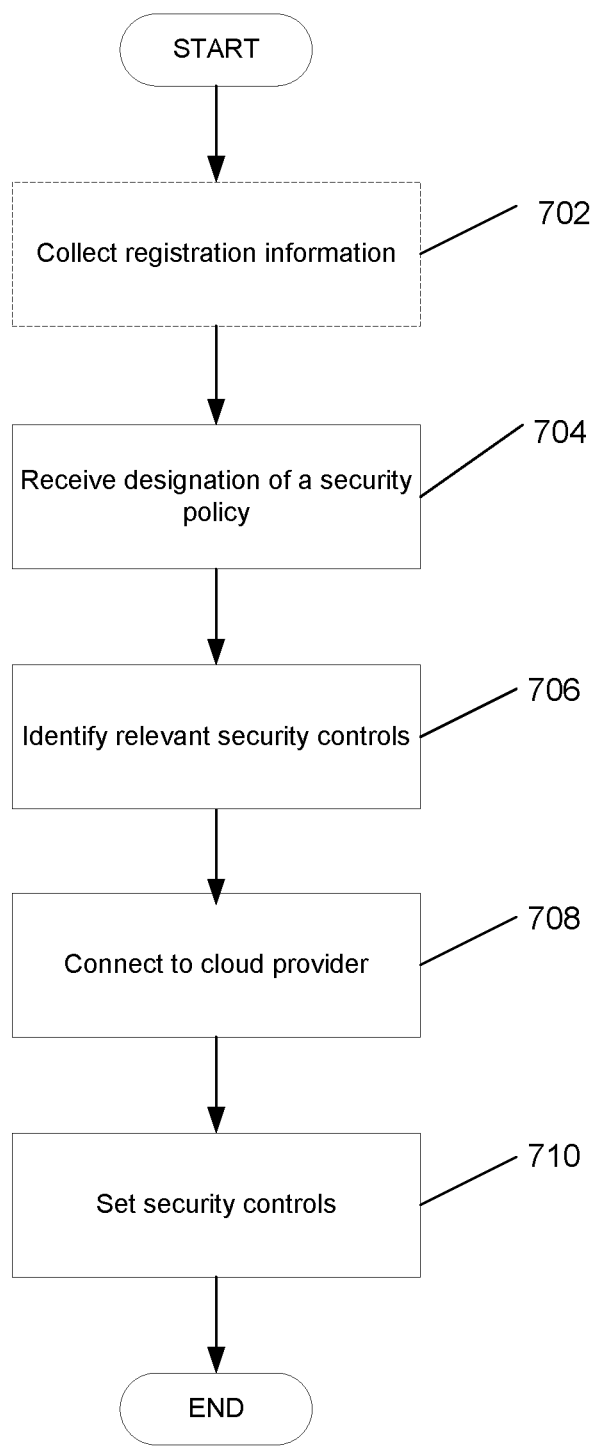
FIG. 7 is a flow chart illustrating a process for provisioning a cloud service to specific security controls in accordance with embodiments of the invention.

A cloud seeder process can be invoked by various applications or by various processes including, but not limited to, a scheduler, incident management system, and/or upon application registration. For example, a cloud seeder process may be initiated by a tenant request, in response to a detected threat, or upon a predetermined schedule. A process for provisioning a cloud application in accordance with embodiments of the invention is illustrated in FIG. 7.

In several embodiments, the process includes collecting (702) registration information from a tenant when registration information has not been previously obtained. Registration information includes authorization to connect to a cloud provider using a tenant's account. Authorization may be provided by a token (such as using the OAuth open standard for authorization) or by credentials (such as a user name and password). In some embodiments, the authorization (via token, credentials, or otherwise) is only provided with respect to the minimum permissions or privileges necessary to configure the relevant security controls. For example, permissions may be granted only to edit user accounts associated with a particular tenant's account and not to access other portions of the cloud service.

In several embodiments, authorization to modify a tenant's account is embodied by a secure token or credentials provided by the tenant. The secure token or credentials are encrypted at rest using encryption keys per any of a variety of encryption standards and stored in a hardware security module (HSM) with access strictly audited. Access to the HSM and encryption keys are regulated by secure software and only trusted code has access to encrypted keys. Transport level access also involves secure communication and any of a variety of encryption techniques. One skilled in the art will recognize that there are various other techniques that can be utilized in authorizing access to a cloud provider's system and data and securing registration information.

The process includes receiving (704) the designation of a security policy. A security policy may be selected or chosen in any of a variety of ways in accordance with embodiments of the invention. Selection may be made by a user from a user interface or automatically by a threat or incident management process in response to a detected threat. A security policy may associate a desired level of security that includes a number of security features with the security controls available in a cloud application to implement that desired level of security. The associations may be stored in a database or other repository and retrieved when the security policy is selected.

The process includes identifying (706) security controls pertinent to the designated security policy. Available security controls may be discovered via processes such as with a cloud crawler application and/or read from an application catalog database as discussed further above. For example, setting a security policy concerning password strength may involve the security controls for password requirements with each cloud application (e.g., number and type of characters).

Using the registration information, the process includes connecting (708) to the cloud provider. The process includes reading the security controls associated with the tenant's account and setting (710) the security controls to the desired configuration. For example, a policy concerning password strength may set security controls governing the number and type of characters required in a password to require at least eight characters using symbols, numbers, and upper and lower case characters.

The processes described above in accordance with embodiments of the invention can be utilized to implement any number of security policies/postures at different levels of security. For example, a security policy at a high level of security may require that user passwords be "strong," e.g., include a variety of characters such as upper and lower case, numbers, and/or symbols. Similarly, security policies at different levels of security may set a session inactivity timer at higher or lower periods of time, e.g., "time out" or automatically log out a user's session. A process to enact a security policy in accordance with embodiments of the invention can identify the relevant security controls in the tenant's accounts with cloud applications to modify and set the controls at the desired values. In several embodiments, software defined security configuration data and/or security controls metadata, discussed further above, can be utilized to identify the relevant security controls.

Specific processes for setting security controls of a cloud application by a security policy are discussed above. Any of a number of processes for setting security controls of a cloud application may be utilized in accordance with embodiments of the invention.

Cloud Beacon

As discussed further above, several techniques can be utilized to remotely retrieve event data from a cloud provider. In further embodiments of the invention, a cloud beacon is embedded in a cloud to monitor activity and capture application activity in real-time. In several embodiments, a cloud beacon can be a Java agent configured and co-located in the running application. In other embodiments, a cloud beacon is a Python program. One skilled in the art will recognize that a cloud beacon can be implemented in any language suitable for the computing environment. The cloud beacon can capture events and activity for one or more tenants utilizing the services of the cloud application. Data captured can include user logins, tokens, session attributes, user roles, groups, data filtering, SQL queries, etc. as well as contextual threat intelligence information such as an IP address reputation, user's geographic location, etc. A cloud beacon can be configured to monitor designated top security vulnerabilities ad security configuration controls as well as capture user activity audit log files for detecting abnormal activities. The collected data can be entered into an analytics and threat intelligence repository database utilizing processes similar to those utilized by a cloud data loader as described further above. In a number of embodiments, a cloud beacon can independently send an alarm based on predetermined events and/or thresholds (as opposed to the alarm being triggered by analysis of data once entered into an analytics repository). Information from a cloud beacon can returned on a scheduled basis and/or in near real-time as collection, events, and/or alerts occur.

Cloud-to-Cloud Threat Warning System

In many embodiments of the invention, a cloud-to-cloud threat warning system provides communications between cloud applications. One cloud application can proactively warn another cloud application of a potential threat. Several business processes require cloud-to cloud-integration. When a threat is identified in a first cloud (e.g., a query from a blocked IP address), a cloud security monitoring and control system in accordance with embodiments of the invention can automatically notify a second cloud that is part of the business process. The notification can include a request or recommendation for a higher level of security controls, such as elevated authentication or OTP validation, in the business process. In several embodiments, the cloud security system can originate and/or coordinate the distribution of notifications and/or alerts to clouds.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method comprising:
   accessing, by a cloud security system, security configuration data from a plurality of cloud provider systems, wherein the security configuration data comprises information describing security controls that govern access to the plurality of cloud provider systems;
   receiving, by the cloud security system, a security policy to be applied to a user of a plurality of cloud applications that are hosted across the plurality of cloud provider systems; and
   sending, by the cloud security system, values for the security controls at the plurality of cloud provider systems to govern the user's access to the plurality of cloud applications that are hosted across the plurality of cloud provider systems, wherein a uniform security policy is enforced across the plurality of cloud provider systems by the cloud security system.

2. The method of claim 1, further comprising:
   monitoring, by a cloud security system, activities by the user across the plurality of cloud applications that are hosted by the plurality of cloud provider systems;
   identifying, by a the cloud security system, a threat based on a correlation of one or more of the activities by the user across the plurality of cloud applications that are hosted by the plurality of cloud provider systems; and
   selecting, by the cloud security system, the security policy based on the threat.

3. The method of claim 1, further comprising:
   generating, by the cloud security system, security controls metadata comprising normalized descriptors for the security controls from the plurality of cloud provider systems, wherein a normalized descriptor in the security controls metadata is mapped to corresponding security controls at the plurality of cloud provider systems.

4. The method of claim 3, wherein sending the values for the security controls at the plurality of cloud provider systems comprises:
   assigning a value for the normalized descriptor; and
   mapping the value to the corresponding security controls at the plurality of cloud provider systems.

5. The method of claim 1, wherein
   the plurality of cloud provider systems provide a plurality of tenant accounts; and
   a tenant account in the plurality of tenant accounts provides a user account for the user.

6. The method of claim 1, further comprising:
   monitoring values of the security controls;
   detecting a drift in a value in the values of the security controls over time; and
   generating a risk event based on the drift in the value.

7. The method of claim 1, further comprising:
   monitoring values of the security controls;
   detecting a change in a value in the values of the security controls that is different in the other values of the security controls; and
   generating a risk event based on the change in the value.

8. A system comprising:
   one or more processors; and
   one or more memory devices storing instructions that, when executed by the one or more processors, cause the one or more processors to perform operations comprising:
      accessing, by a cloud security system, security configuration data from a plurality of cloud provider systems, wherein the security configuration data comprises information describing security controls that govern access to the plurality of cloud provider systems;
      receiving, by the cloud security system, a security policy to be applied to a user of a plurality of cloud applications that are hosted across the plurality of cloud provider systems; and
      sending, by the cloud security system, values for the security controls at the plurality of cloud provider systems to govern the user's access to the plurality of cloud applications that are hosted across the plurality of cloud provider systems, wherein a uniform security policy is enforced across the plurality of cloud provider systems by the cloud security system.

9. The system of claim 8, wherein the operations further comprise:
   monitoring, by a cloud security system, activities by the user across the plurality of cloud applications that are hosted by the plurality of cloud provider systems;
   identifying, by a the cloud security system, a threat based on a correlation of one or more of the activities by the user across the plurality of cloud applications that are hosted by the plurality of cloud provider systems; and
   selecting, by the cloud security system, the security policy based on the threat.

10. The system of claim 9, wherein the operations further comprise:
    generating a threat model using one or more of the activities by the user, wherein the correlation is determined based on profile information of the user, the user being associated with a tenant account that provides access to the plurality of cloud applications that are hosted by the plurality of cloud provider systems.

11. The system of claim 8, wherein the operations further comprise:
    establishing connections with the plurality of cloud provider systems to access a tenant account provided by the plurality of cloud provider systems, wherein the connections are established based on credential information for the tenant account; and
    accessing one or more activities by the user for across the plurality of cloud applications.

12. The system of claim 8, wherein the operations further comprise:
    determining, using the security policy, a remediation action for at least one of the plurality of cloud applications.

13. The system of claim 12, wherein the remediation action comprises preventing the user from accessing the at least one of the plurality of cloud applications.

14. The system of claim 8, wherein the operations further comprise:
provides a user interface that displays the security controls for the plurality of cloud provider systems, wherein the security controls are editable through the user interface.

15. A non-transitory computer-readable medium comprising instructions that, when executed by one or more processors, cause one or more processors to perform operations comprising:
accessing, by a cloud security system, security configuration data from a plurality of cloud provider systems, wherein the security configuration data comprises information describing security controls that govern access to the plurality of cloud provider systems;
receiving, by the cloud security system, a security policy to be applied to a user of a plurality of cloud applications that are hosted across the plurality of cloud provider systems; and
sending, by the cloud security system, values for the security controls at the plurality of cloud provider systems to govern the user's access to the plurality of cloud applications that are hosted across the plurality of cloud provider systems, wherein a uniform security policy is enforced across the plurality of cloud provider systems by the cloud security system.

16. The non-transitory computer-readable medium of claim 15, wherein the operations further comprise:
monitoring, by a cloud security system, activities by the user across the plurality of cloud applications that are hosted by the plurality of cloud provider systems;
identifying, by a the cloud security system, a threat based on a correlation of one or more of the activities by the user across the plurality of cloud applications that are hosted by the plurality of cloud provider systems; and
selecting, by the cloud security system, the security policy based on the threat.

17. The non-transitory computer-readable medium of claim 15, wherein the security controls comprise a password requirement and an authentication process.

18. The non-transitory computer-readable medium of claim 15, wherein the operations further comprise:
generating normalized activity data by normalizing activities by the user across the plurality of cloud applications.

19. The non-transitory computer-readable medium of claim 15, wherein:
the user is associated with a user account that is one of a plurality of user accounts in a tenant account;
the tenant account operates each of the plurality of cloud applications hosted by the plurality of cloud service provider systems;
the plurality of cloud service providers operate computer systems that are separate and distinct from each other; and
the cloud security system operates on a computer system that is separate and distinct from the computer systems operated by the plurality of cloud service providers.

20. The non-transitory computer-readable medium of claim 15, wherein the operations further comprise:
identifying a subset of the security controls that are pertinent to the security policy, wherein values are sent to the subset of the security controls at the plurality of cloud provider systems to govern the user's access to the plurality of cloud applications.

* * * * *

UNITED STATES PATENT AND TRADEMARK OFFICE
CERTIFICATE OF CORRECTION

PATENT NO. : 11,962,614 B2
APPLICATION NO. : 17/174673
DATED : April 16, 2024
INVENTOR(S) : Kirti et al.

It is certified that error appears in the above-identified patent and that said Letters Patent is hereby corrected as shown below:

In the Claims

In Column 21, Line 38, in Claim 2, delete "a the" and insert -- the --, therefor.

In Column 22, Line 37, in Claim 9, delete "a the" and insert -- the --, therefor.

In Column 23, Line 33, in Claim 16, delete "a the" and insert -- the --, therefor.

Signed and Sealed this
Sixth Day of August, 2024

Katherine Kelly Vidal
*Director of the United States Patent and Trademark Office*